(12) United States Patent
Fujii et al.

(10) Patent No.: US 6,200,076 B1
(45) Date of Patent: Mar. 13, 2001

(54) CUTTING TOOL AND METHOD FOR PRODUCING THE SAME

(75) Inventors: Yasuyoshi Fujii; Seiji Matsuura; Kazuhiro Kaneko, all of Ibaraki-ken (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/497,858

(22) Filed: Feb. 4, 2000

Related U.S. Application Data (62) Division of application No. 09/015,664, filed on Jan. 29, 1998, now Pat. No. 6,058,807.

(30) Foreign Application Priority Data

| Jan. 31, 1997 | (JP) | 9-019485 |
| Jun. 18, 1997 | (JP) | 9-161393 |
| Aug. 1, 1997 | (JP) | 9-208101 |

(51) Int. Cl.$^7$ ............... B23B 51/00; B21K 5/04
(52) U.S. Cl. ............... 408/226; 29/432; 29/525; 403/280; 403/282; 76/108.1; 76/108.6
(58) Field of Search ............... 408/226; 76/108.1, 76/108.6; 29/525, 432; 403/282, 280; 279/102

(56) References Cited

U.S. PATENT DOCUMENTS

| 1,539,413 | 5/1925 | Fish | 76/108 |
| 1,703,899 | 3/1929 | Petley | 76/108.6 |
| 2,161,062 | 6/1939 | Killgore | 76/108.1 |
| 3,053,118 | 9/1962 | Lavallee | 76/108.1 |
| 3,850,054 | 11/1974 | Weissman | 76/108.1 |
| 4,225,114 | * 9/1980 | Barthelemy et al. | 29/525 |
| 4,462,293 | 7/1984 | Gunzner | 76/112 |
| 5,048,375 | 9/1991 | Kobayashi | 76/108.6 |
| 5,074,025 | 12/1991 | Willard, III | 408/226 |
| 5,526,716 | 6/1996 | Arai et al. | 76/108.1 |
| 6,058,807 | * 5/2000 | Fujii et al. | 408/226 |

FOREIGN PATENT DOCUMENTS

| 2811977 | * 9/1979 | (DE) | 408/226 |
| 6-344212 | 12/1994 | (JP) . | |
| 8204412 | * 12/1982 | (WO) | 408/226 |

* cited by examiner

Primary Examiner—Steven C. Bishop
(74) Attorney, Agent, or Firm—Oblon, Spivak, McClelland, Maier & Neustadt, P.C.

(57) ABSTRACT

A method for producing cutting tools incorporated in the present invention is carried out as follows: a shank portion and a drill portion are formed separately such that the inner diameter of a hole made in the shank portion is slightly smaller than the outer diameter of the drill portion. The rear of the drill portion is forcibly inserted into the hole of the shank portion at normal temperature which is room temperature. The diameter of the inner wall of the hole is thereby enlarged, resulting in a tight fitting. After the insertion of the drill portion in the shank portion, the drill portion may be ground to form a drill edge. Before the insertion of the drill portion in the shank portion, the shank portion may be quenched under vacuum or the like, or the surface of the shank portion may be hardened by nitriding.

6 Claims, 6 Drawing Sheets

CUTTING TOOL AND METHOD FOR PRODUCING THE SAME

This application is a Division of application Ser. No. 09/015,664 filed on Jan 29, 1998, now U.S. Pat. No. 6,058,807.

BACKGROUND OF THE INVENTION

1. Field of the Invention

The present invention relates to composite-type cutting tools, whose drill portion and shank portion are made of different materials, and a method for producing such tools, for example, miniature drills used for making small-diameter holes in a printed circuit board.

This application claims priority of Japanese Patent Application Nos. 9-19485, 9-161393, and 9-208101 which are hereby incorporated by reference.

2. Discussion of the Background

Generally, miniature drills are used for making holes having extremely small-diameters. Thus, miniature drills have: a cylindrical drill portion having a diameter of approximately 0.1 to 3.175 mm at the tip end of the drill body; and a larger-diameter shank portion at the rear end, which is used for holding the drill body in the axis of rotation of the machine tools. In general, the drill portion is formed from a cemented carbide.

Thus, to produce a solid-type miniature drill, the drill portion and the shank portion are integrally formed, for example, by grinding a cylindrical cemented carbide. Since such a cemented carbide is expensive and a large amount of the cemented carbide is ground for forming the drill portion, the cost inevitably increases.

Meanwhile, composite drills have been suggested which are produced as follows: a small-diameter drill portion is formed from a substantially cylindrical cemented carbide; a large-diameter shank portion is made from a low-cost material, such as steel or SUS, different from the material used for the drill portion; and the rear of the drill portion is allowed to fit into a hole made in the tip end of the shank portion.

FIGS. 12(A) to 12(E) show a method for producing such a conventional composite drill.

Figure 12:
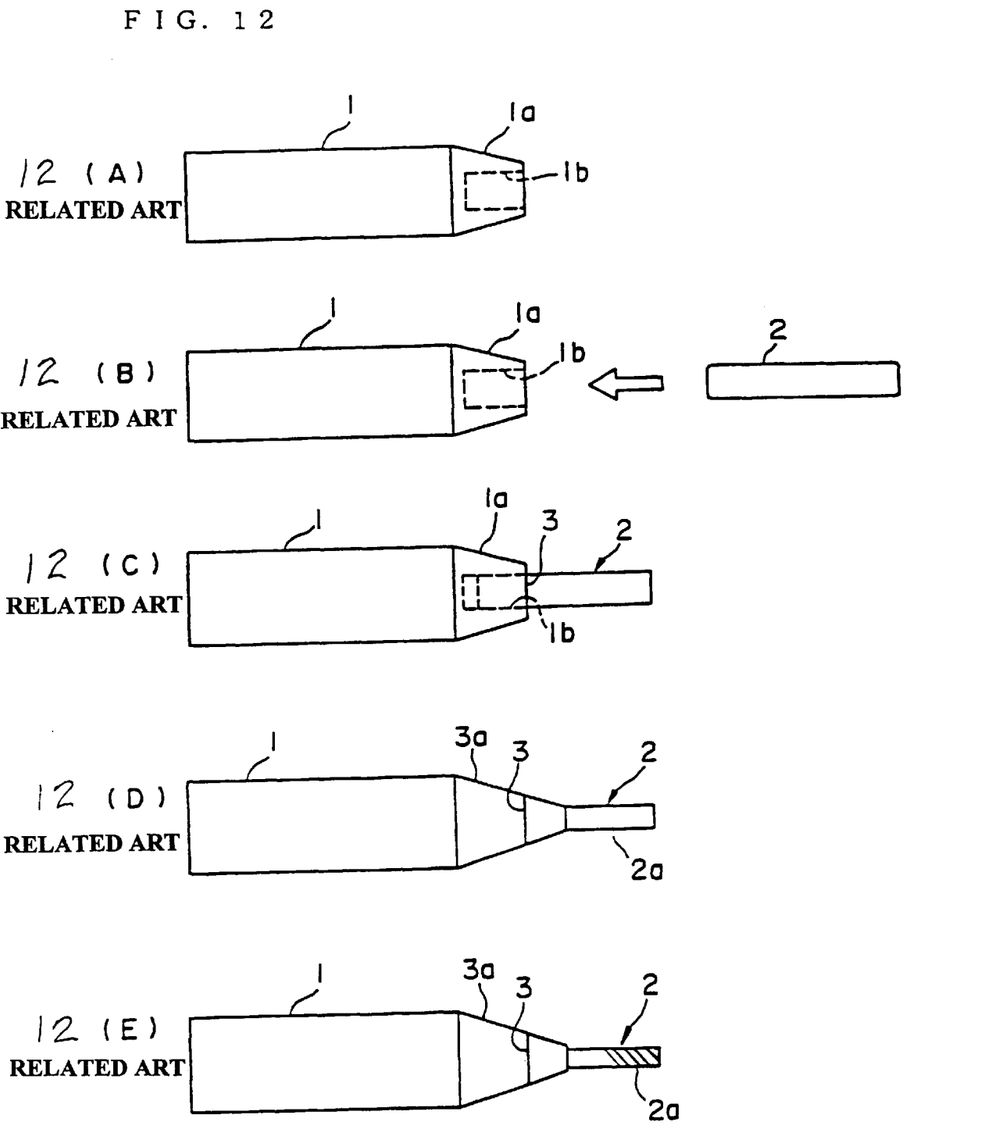

A shank portion 1 shown in FIG. 12(A) has a tapered portion 1a at the tip end and a hole 1b made in the end face of the tapered portion 1a.

According to shrinkage fitting, a substantially cylindrical drill portion 2 is pressed into the hole 1b while enlarging the diameter of the hole 1b by high-frequency heating (see FIG. 12(B)). Since the outer diameter of the drill portion 2 is set to be slightly larger than the inner diameter of the hole 1b, the inner wall of the hole 1b is shaved to produce chips by the insertion. The chips are pushed into the bottom of the hole 1b by the drill portion 2. The diameter of the hole 1b is then shrunk by cooling to achieve a tight fit.

The drill portion 2 can also be fitted to the hole 1b by brazing as follows: the drill portion 2 is pressed into the hole 1b having an inner diameter slightly larger than the outer diameter of the drill portion 2, and then, brazed.

Both sides of a joint 3, shown in FIG. 12(C), formed between the tapered portion 1a of the shank portion 1 and the drill portion 2 are finely ground to form a tapered face 3a having a smooth linear taper from the shank portion 1 to the drill 2 (see FIG. 12(D)), and the tip end of the drill portion 2 in succession to the tapered face 3a is ground to form a drill edge 2a (see FIGS. 12(D) and 12(E)).

However, since such methods for producing composite drills need a large number of steps, the process becomes complicated and laborious, disadvantageously increasing the cost. Furthermore, before pressing the drill portion 2 into the shank portion 1, the shank portion 1 is annealed by high frequency heating in the case of shrinkage fitting and by a flux in the case of brazing. Thus, the hardness of the shank portion 1 decreases so that the fastening strength due to the fitting to the drill portion 2 is disadvantageously reduced.

Furthermore, the drill portion 2 heated by high frequency heating is undesirably deformed when it is pressed into the hole 1b. The fastening strength due to fitting is also lowered by shaving the inner wall of the hole 1b. Furthermore, since the length of the drill portion 2 exposed outside the shank portion 1 varies with the amount of the shaved chips, it is necessary to adjust the length of the shank portion 1 to achieve a constant total length of the miniature drills.

Moreover, disadvantageously, the inner wall of the hole 1b is readily corroded by the flux at the time of brazing.

In addition, since the shank portion 1 and the drill portion 2 are made of different materials, it is difficult to simultaneously grind both of them into the linearly tapered face 3a over both sides of the joint 3 between the shank portion 1 and the drill portion 2.

SUMMARY OF THE INVENTION

Accordingly, an object of the present invention is to provide a method for producing a cutting tool, by which method the drill portion is not deformed by fitting to the shank portion, and a cutting tool that can be easily produced having a high fastening strength.

Another object of the present invention is to provide a cutting tool whose drill portion and shank portion are joined by a joint having high fastening strength and which can be easily produced.

To achieve the above objects, a method for producing a cutting tool incorporated in the present invention is characterized in that where a cutting tool prepared by fitting a drill portion into a hole of a shank portion, the inner diameter of the hole of the shank portion is formed slightly smaller than the outer diameter of the drill portion, and the rear of the drill portion is pressed into the hole of the shank portion at normal temperature which is room temperature.

By forcibly pressing the drill portion into the hole of the shank portion at normal temperature, the drill portion shaves the inner wall of the hole while enlarging the hole, and is tightly fitted into the hole. Since the joint is achieved without brazing, the number of steps is low and the procedure is simplified, and furthermore, the drill portion, which is to be used for cutting, is not deformed because the procedure is carried out at normal temperature which is room temperature.

Moreover, according to one preferred embodiment of the present invention, the drill edge of the drill portion is formed by grinding after pressing the drill portion into the shank portion. Thus, only the drill portion is required to be ground to form the drill edge, resulting in easier grinding.

According to another preferred embodiment of the present invention, the shank portion is quenched before fitting. Therefore, the hardness of the resulting shank portion increases, and a cutting tool having a high joint strength can be formed with high accuracy because the inner diameter of the hole is enlarged by pressing the drill portion into the hole of the shank portion without being readily shaved. Thus, the shank portion is not damaged by shaved chips produced by processing. Furthermore, a less deformed shank portion having a smooth surface can be achieved by quenching under vacuum. Moreover, if the surface of the shank portion is hardened by nitriding before fitting, the shank portion becomes harder, the joint strength with the drill portion increases, and deformation does not occur because heat treatment such as quenching is not required.

The rear of the drill portion has a rounded or linearly chamfered edge, or the like. Thus, when the drill portion is pressed into the hole, the chamfered edge presses and enlarges the inner diameter of the hole without shaving the inner wall, resulting in a reliable fastening fit. If the rear of the drill portion has a sharp edge, the inner wall of the hole is shaved by pressing the drill portion into the hole.

A cutting tool incorporated into the present invention is characterized in that a small-diameter drill portion is fitted to a hole of a large-diameter shank portion, a step is formed at the joint between the shank portion and the drill portion, and the drill portion is formed into a drill edge.

The diameter of the shank portion is larger than that of the drill portion by the height of the step formed at the joint between the shank portion and the drill portion. Therefore, the strength of the cutting tool increases and the tool life is extended. Additionally, it is not necessary to grind the joint into a tapered shape over the shank portion and the drill portion. Thus, the grinding step becomes simpler, resulting in simplified production.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7(A) to (D) show production steps of the miniature drill shown in FIG. 6, FIG. 7(A) is a side view of a shank portion, FIG. 7(B) is a diagram showing a drill portion and the shank portion before inserting the drill portion into the shank portion, FIG. 7(C) is a diagram showing the drill portion and the shank portion after the insertion, and FIG. 7(D)) is a diagram showing a tapered portion of the drill portion and a drill edge both formed by grinding;

FIGS. 12(A) to 12(E) show production steps of a conventional miniature drill, FIG. 12(A) is a side view of a shank portion, FIG. 12(B) is a diagram showing a drill portion and the shank portion before inserting the drill portion into the shank portion, FIG. 12(C) is a diagram showing the drill portion and the shank portion after the insertion, FIG. 12(D) is a diagram showing a tapered portion of the shank portion and a drill portion both formed by simultaneously grinding, and FIG. (E) is a side view of the miniature drill provided with a twist through flute.

DESCRIPTION OF THE PREFERRED EMBODIMENTS

Figure 1:
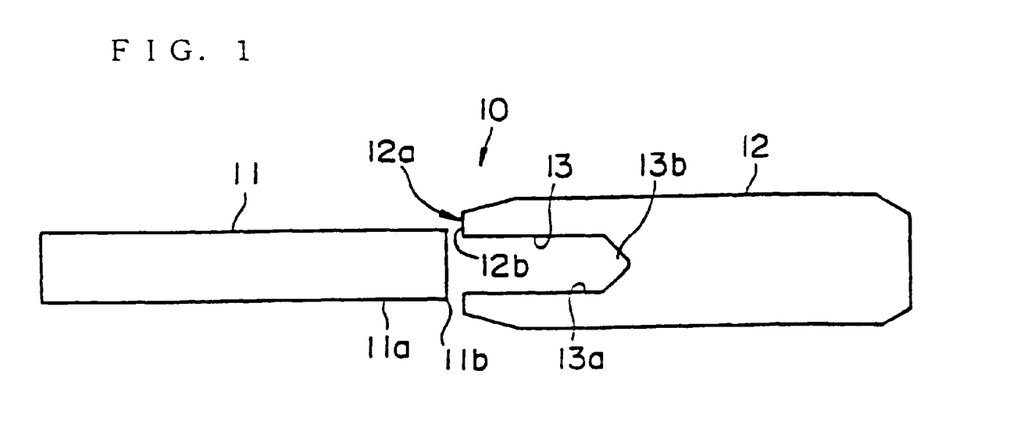
FIG. 1 is a cross-sectional diagram showing a drill portion and a shank portion of a composite drill incorporated in the first embodiment of the present invention before fitting.
Figure 2:
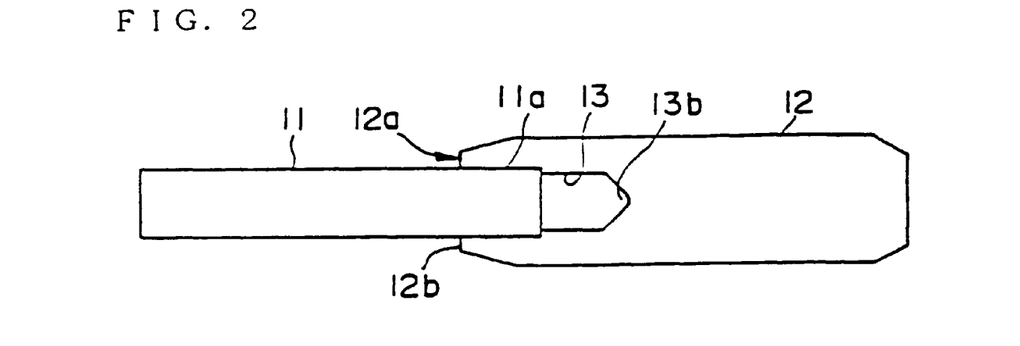
FIG. 2 is a cross-sectional diagram showing the drill portion and the shank portion of the composite drill incorporated in the first embodiment of the present invention during fitting.
Figure 3:
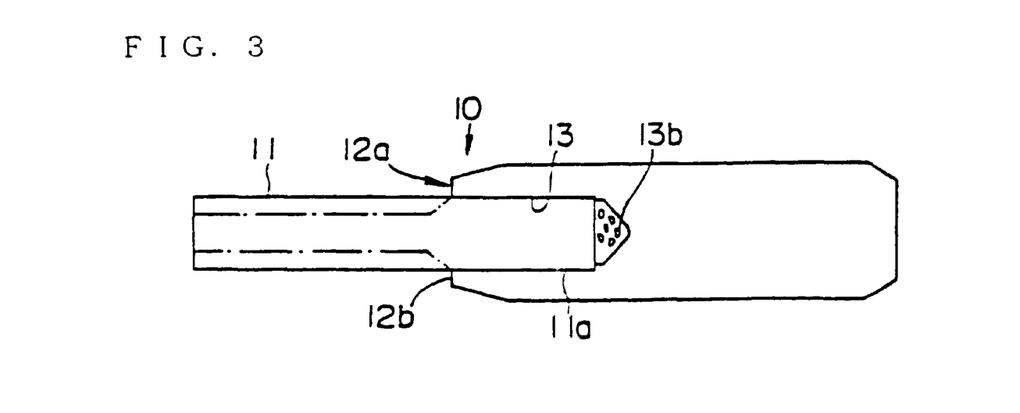
FIG. 3 is a cross-sectional diagram showing the drill portion and the shank portion of the composite drill incorporated in the first embodiment of the present invention after fitting.

Referring now to the drawings, wherein like reference numerals designate identical or corresponding parts throughout the several views, and more particularly to FIGS. 1 through 3 thereof which show the first embodiment of the present invention. For example, a miniature drill 10 shown in FIG. 1 is formed from a substantially cylindrical drill portion 11 which has a diameter of approximately 0.1 to 3.175 mm and which is made of cemented carbide and a substantially cylindrical shank portion 12 which has a larger diameter (e.g., 3 to 6 mm as the outer diameter) and which is made of SUS, steel, or the like.

A rear edge 11b of a rear 11a of the drill portion 11 has a sharp square edge (e.g., not more than 90°) which is not chamfered. The shank portion 12 has a substantially cylindrical hole 13 coaxially formed from the tip end face 12a along the longitudinal axis of the shank portion 12. The inner diameter of the hole 13 is, for example, 1.4 mm, and is smaller than the outer diameter of the drill portion 11 by a small amount (e.g., by 10 $\mu$m).

Although the difference between the inner diameter of the hole 13 and the outer diameter of the drill portion 11 alters according to the size of the drill portion 11 and the shank portion 12, for example, the difference is set above 0 and not more than 100 $\mu$m. If the difference is larger than 100 $\mu$m, the force fitting becomes difficult. Preferably, the difference is not more than 50 $\mu$m, and more preferably, not more than 20 $\mu$m.

The opening of the hole 13 of the shank portion 12 is not chamfered, and the outer edge of the tip end face 12a is chamfered leaving the shoulder 12b. The depth of the hole 13 is set to be slightly longer than the length of the rear 11a of the drill portion 11 to be fitted into the hole 13. The inner wall 13a of the hole 13 is gradually narrowed near the bottom of the hole 13 so that a space 13b is formed for storing chips when the rear 11a of the drill portion 11 is fitted (see FIG. 3).

This embodiment has the above-described structure. A method for assembling the miniature drill 10 will be explained below.

At normal temperature, which is room temperature, the rear 11a of the drill portion 11 is coaxially put onto the hole 13 made in the tip end face 12a of the shank portion 12 and pressed into the hole 13 with high strength or force (FIG. 1). As a result, the diameter of the inner wall 13a of the hole 13 is enlarged and shaved, little by little, by the rear edge 11b of the drill portion 11, and the rear 11a of the drill portion 11 is pressed into the hole 13 (see FIG. 2). The shaved chips are gradually pushed to the bottom of the hole 13.

As is shown in FIG. 3, the fitting between the drill portion 11 and the shank portion 12 is completed when the rear 11a of the drill portion 11 is pushed into the bottom of the hole 13 with the chips shaved from the inner wall 13a being stored in the space 13b formed in the bottom of the hole 13.

The drill portion 11 may then be ground to a more slender shape, as is shown by the single dot chain line in FIG. 3.

As is mentioned above, according to the first embodiment, the drill portion 11 can be tightly fitted to the shank portion 12 at normal temperature, which is room temperature, without brazing or shrinkage fitting. Thus, low-cost production is achieved by a small number of steps, and highly accurate miniature drills can be readily produced since the drill portion 11 and the shank portion 12 are not deformed by heat. Since the rear edge 11b is sharp, the drill portion 11 can be easily produced at low cost, and the inner wall 13a of the hole 13 is shaved by the rear edge 11b when the drill portion 11 is pressed into the hole 13.

Figure 4:
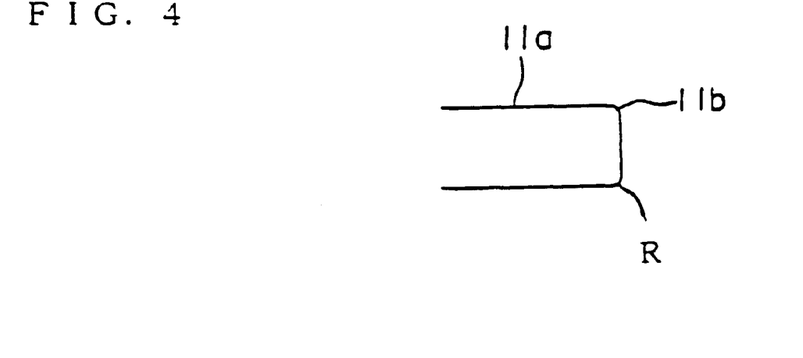
FIG. 4 is a diagram showing the rear edge of a drill portion incorporated in a modification.
Figure 5:
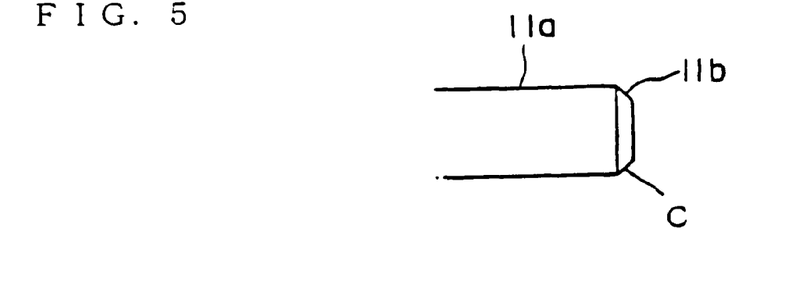
FIG. 5 is a diagram showing the rear edge of a drill portion incorporated in another modification.

The rear edge 11b is not always required to be sharp. For example, the rear edge 11b may be chamfered in a circular arc (R≦0.1 mm), as is shown in FIG. 4. In such a case, the drill portion 11 can be more readily pressed into the hole 13, and also, more easily produced by barrel finishing or the like. Furthermore, the rear edge 11b may be linearly chamfered (C≦0.1 mm), as is shown in FIG. 5. Although the processing costs for such chamfered shapes are higher than those for other shapes, the drill portion 11 can be fitted to the hole 13 while enlarging the diameter of the inner wall of the hole 13 without producing shaved chips from the inner wall if the rear edge 11b is chamfered. Therefore, the length of the miniature drill 10 can be made a certain value by setting the lengths of the drill portion 11 and the shank portion 12, resulting in a reliable joint between the drill portion 11 and the shank portion 12 by fitting, and easier insertion.

Other embodiments of the present invention will be described below. The numerals in the different views identify substantially identical parts in the first embodiment, and detailed explanations thereof are omitted.

FIGS. 6 and 7(A) to 7(D) show the second embodiment of the present invention.

Figure 6:
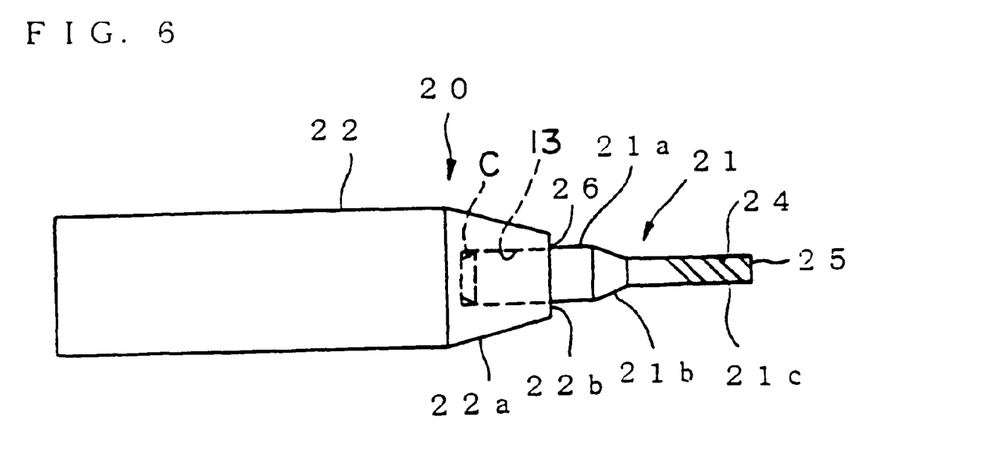
FIG. 6 is a side view showing a miniature drill incorporated in the second embodiment of the present invention.

A miniature drill 20 shown in FIG. 6 has a substantially cylindrical drill portion 21 having a small diameter and a substantially cylindrical shank portion 22 having a larger diameter.

The diameter of the tip side of the shank portion 22 is gradually reduced to form a conically tapered portion 22a, and the tip end face of the tapered portion 22a has a circular planar shoulder 22b. The diameter of the shoulder portion 22b is larger than the outer diameter of the drill portion 21, and a hole 13 is made from the shoulder 22b towards the inside of the shank portion 22, coaxially with the shank portion 22.

The drill portion 21 has: a substantially cylindrical stem 21a having a relatively large diameter; a cylindrical drill edge 21c having a smaller diameter; and a tapered portion 21b formed between the stem 21a and the drill edge 21c such that the diameter of the tapered portion 21b is gradually decreased from the stem 21a to the drill edge 21c. The rear of the stem 21a is pressed into the hole 13 of the shank portion 22 to fit the drill portion 21 to the shank portion 22. For example, the drill edge 21c has: a twist through flute 24; and a cutting edge 25, which is the cross ridge line made by a wall of the twist through flute 24 facing the rotating direction and the tip end face of the drill edge 21c.

As a result, a step 26 having a shoulder 22b is formed between the tapered portion 22a of the shank portion 22 and the stem 21a of the drill portion 21, and at the tip side of the drill portion 21, a certain distance from the step 26, the tapered portion 21b and the drill edge 21c are continuously formed.

The miniature drill 20 of the second embodiment has the above structure. A method for producing the miniature drill 20 will be explained with reference to FIGS. 7(A) to 7(D).

In FIGS. 7(A) to 7(D), the shank portion 22 has the same shape as that shown in FIG. 6, the drill portion 21 to be fitted to the shank portion 22 is formed in a substantially cylindrical shape having the same outer diameter as that of the stem 21a shown in FIG. 6, and the rear end of the drill portion 21 is chamfered with a taper into a chamfered portion C. The minimum diameter of the chamfered portion C is smaller than the inner diameter of the hole 13 of the shank portion 22, and the maximum diameter of the chamfered portion C is the same as the stem 21a which is slightly larger than the inner diameter of the hole 13.

Figure 7:
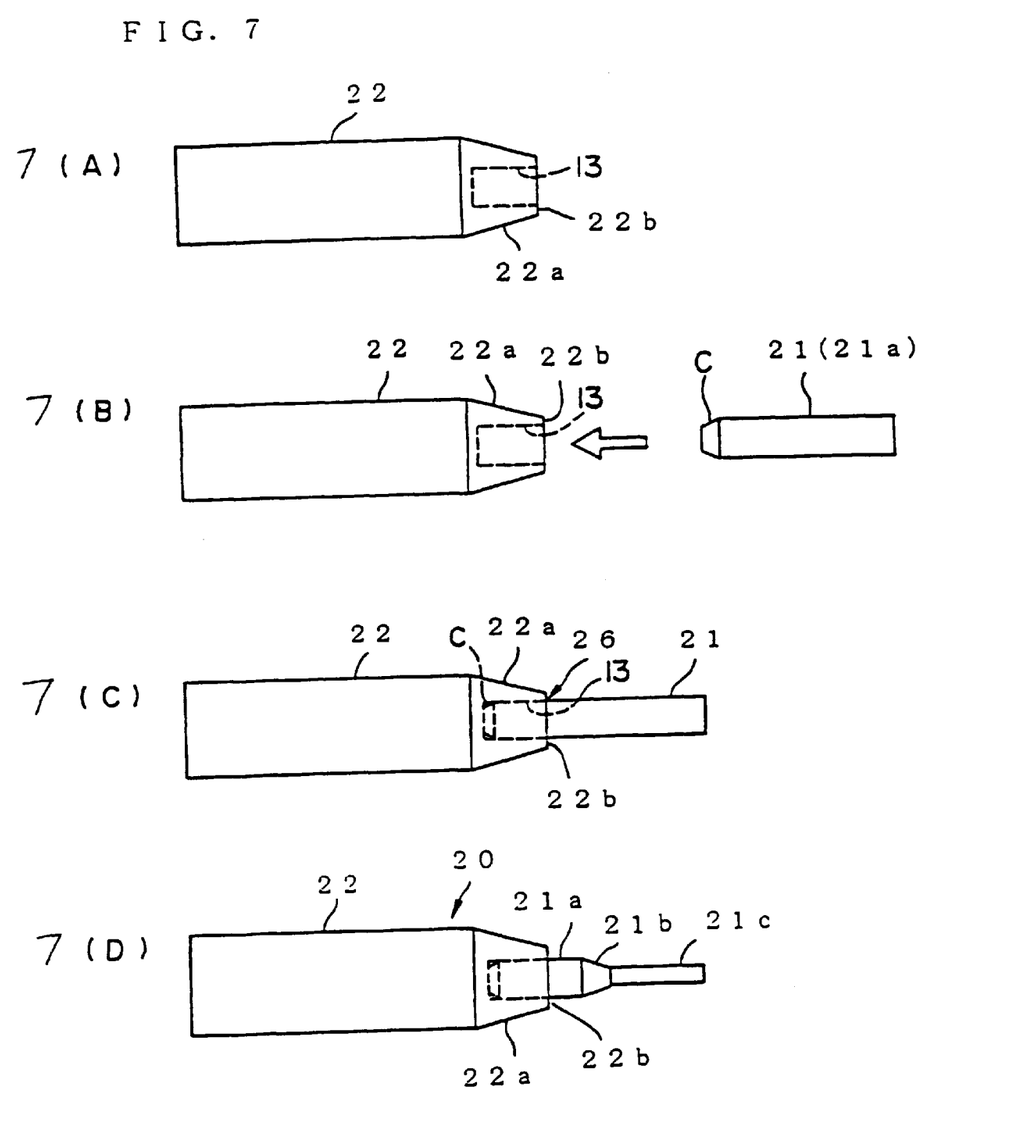

The inner diameter of the hole 13 of the shank portion 22 is, for example, approximately 1.4 mm, and is set to be smaller than the outer diameter of the drill portion 21 (the stem 21a), except for the chamfered portion C, by a slight value (e.g. 10 μm).

For producing the miniature drill 20, the chamfered portion C of the rear end of the drill portion 21 is coaxially pressed into the hole 13 of the shoulder 22b of the shank portion 22 at normal temperature which is room temperature. The inner wall of the hole 13 is thereby pressed by the chamfered portion C of the drill portion 21 and its diameter is enlarged, little by little, to allow the rear of the drill portion 21 to be inserted into the hole 13.

The total length of the miniature drill 20 is determined by allowing the drill portion 21 to be inserted into the shank portion 22 until the length from the rear end of the shank portion 22 to the tip of the drill portion 21 reaches the predetermined value, and the fitting step of pressing the drill portion 21 into the shank portion 22 is completed (see FIG. 7(C)). As a result, a step 26 having a shoulder 22b is formed between the tapered portion 22a and the drill portion 21 at the joint between the shank portion 22 and the drill portion 21.

A portion of the drill portion 21, at a predetermined distance from the shoulder 22b, is then ground to form the tapered portion 21b and the cylindrical drill edge 21c having a small diameter. The drill edge 21c is provided with the twist through flute 24 and the cutting edge 25.

By the above procedure, the miniature drill 20 shown in FIG. 6 is produced.

As is mentioned above, according to the miniature drill 20 of the second embodiment, the shank portion 22 has a step 26 due to the shoulder 22b. Thus, the strength of the miniature drill 20 is higher than that of conventional miniature drills because of the height of the step 26, resulting in longer tool life.

Furthermore, according to a method for producing the miniature drill 20 incorporated in the second embodiment of the present invention, in addition to the advantages due to the first embodiment, grinding can be carried out more readily and accurately because the tapered portion 22a of the shank portion 22 and the tapered portion 21b of the drill portion 21 are not formed in a continuous linear shape and only the tapered portion 21b of the drill portion 21 is ground.

Although, the tapered portion 21b of the drill portion 21 is formed in a portion at a predetermined distance from the step 26 of the shank portion 22 in the second embodiment, the present invention is not restricted, and the tapered portion 21b may be formed continuously from the step 26 (shoulder 22b). Furthermore, the shank portion 22 is not always required to have the tapered portion 22a. In such a case, the step 26 is determined by the difference between the outer diameter of the shank portion 22 and the drill portion 21.

The third embodiment of the present invention will be described with reference to FIGS. 8 to 11.

Figure 8:
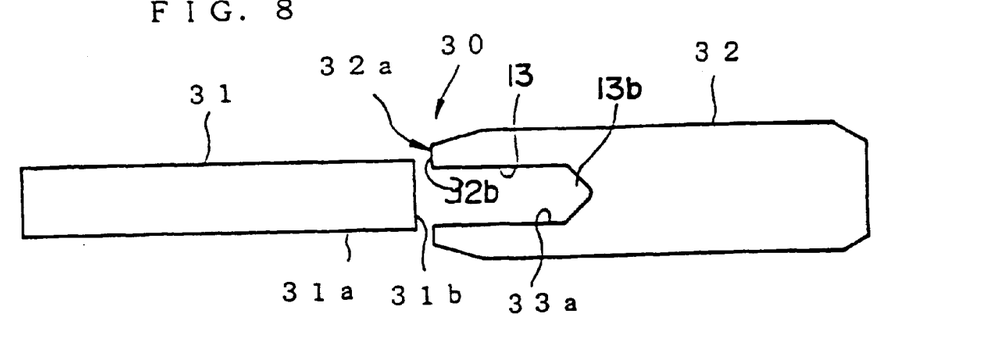
FIG. 8 is a cross-sectional diagram showing a drill portion and a shank portion of a composite drill incorporated in the third embodiment before inserting the drill portion into the shank portion.

For example, a miniature drill 30 shown in FIG. 8 has: a substantially cylindrical drill portion 31 having a diameter of approximately 0.1 to 3.175 mm; and a substantially cylindrical shank portion 32 having a larger diameter (e.g., 3 to 6 mm as the outer diameter).

A rear edge 31b of a rear 31a of the drill portion 31 has a sharp square edge (e.g., not more than 90°) without being chamfered. The shank portion 32 has a substantially cylindrical hole 13 coaxially formed with the shank portion 32 from the tip end face 32a along its longitudinal axis. For example, the inner diameter of the hole 13 is set to 1.4 mm, which is smaller than the outer diameter of the drill portion 31 by a small amount (e.g., by 10 μm).

The shank portion 32 is prepared as follows: a cylinder of material of approximately 35 to 50 HRC is obtained by vacuum quenching (prism-shaped materials or the like may be used instead); and is machined such that the opening of the hole 13 is not chamfered and the outer edge of the tip end face 32a is chamfered leaving a shoulder 32b. The depth of the hole 13 is set to be slightly longer than the rear 31a to be pressed into the hole 13 of the drill portion 31. Near the bottom of the hole 13, the inner diameter of the hole 13 is gradually decreased to form a space 13b for storing shaved chips when the rear 31a of the drill portion 31 is fitted (see FIG. 10).

This embodiment has the above-described structure. A method for assembling the miniature drill 30 will be explained below.

Figure 11:
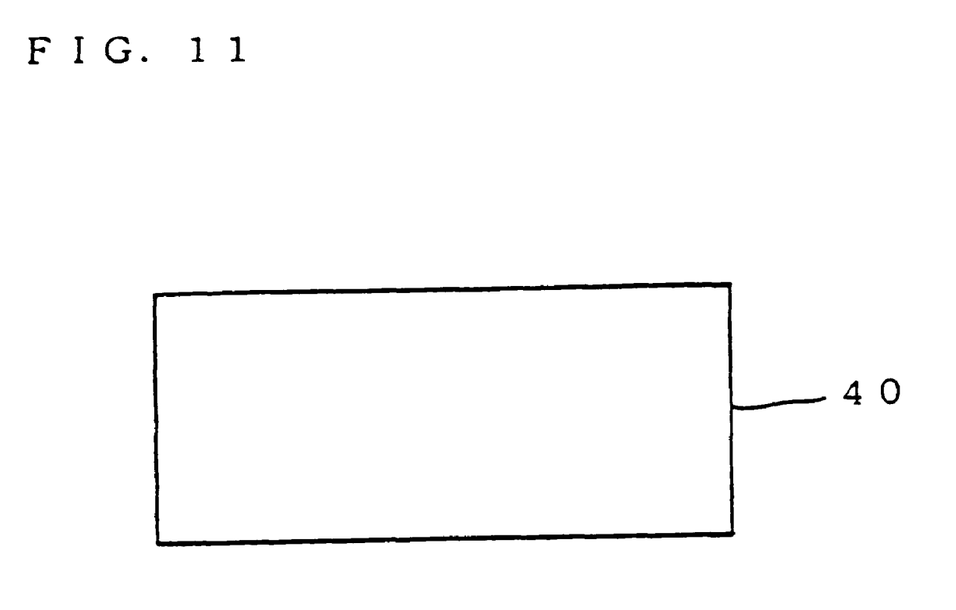
FIG. 11 is a side view of a cylinder of material before being machined into a shank portion.

A cylinder of material 40 shown in FIG. 11 to be formed into the shank portion 32 is vacuum quenched so as to achieve approximately 35 to 50 HRC, which is higher than that obtained without quenching (approximately 24 HRC). As compared with conventional quenching under a normal atmosphere, a smoother surface can be obtained with less deteriorated accuracy in size by quenching under vacuum because of less deformation and no oxidation. Therefore, the polishing step for surface treatment after quenching becomes unnecessary or simplified.

The resulting cylinder of material 40 is then machined into the shank portion 32 as is shown in FIG. 8.

Coaxially with the hole 13 formed in the tip end face 32a of the shank portion 32, the rear 31a of the drill portion 31 is then inserted into the hole 13 with high strength or force at normal temperature which is room temperature. As a result, the diameter of the inner wall 33a of the hole 13 is enlarged by the rear edge 31b of the drill portion 31, and the rear 31a of the drill portion 31 is pressed into the hole 13 (see FIGS. 8 and 9).

Figure 9:
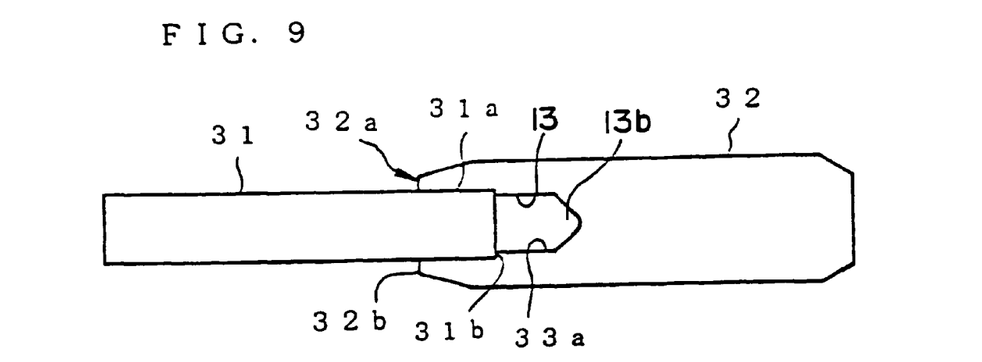
FIG. 9 is a cross-sectional diagram showing the drill portion and the shank portion of a composite drill incorporated in the third embodiment during insertion.

Since the whole shank portion 32 is hardened by quenching, when the rear edge 31b of the drill portion 31 is pressed into the hole 13 of the shank portion 32, the inner wall 33a of the hole 13 is not largely shaved and the inner diameter is gradually enlarged, resulting in an increased joint strength with the drill portion 31.

Meanwhile, assuming that the drill portion 31 is pressed into the shank portion 32 made of an unquenched material, such as untreated SUS, the inner wall 33a of the hole 13 is disadvantageously damaged by being shaved or the shank portion 32 may be damaged by cutting chips while using the miniature drill 30 for cutting.

Figure 10:
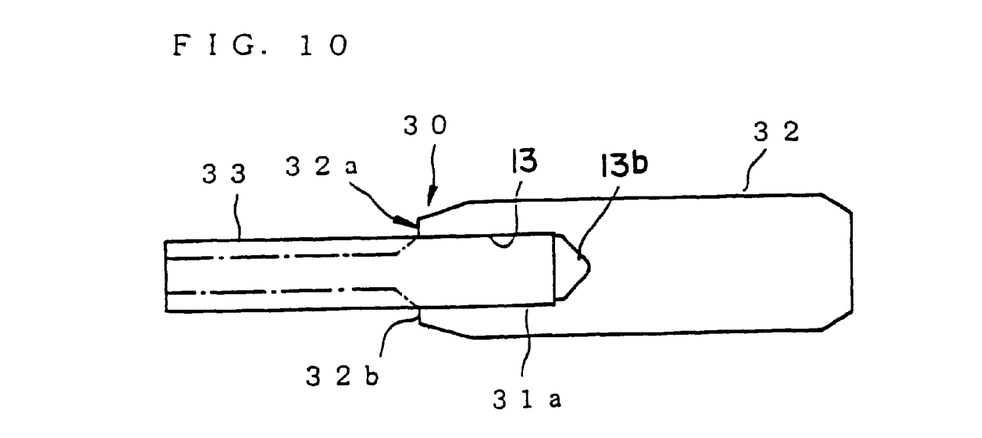
FIG. 10 is a cross-sectional diagram showing the drill portion and the shank portion of a composite drill incorporated in the third embodiment after the insertion.

As is shown in FIG. 10, the rear 31a of the drill portion 31 is pressed into the bottom of the hole 13 with a small amount of chips shaved from the inner wall 33a being stored in the space 13b formed in the bottom of the hole 13.

The drill portion 31 may then be ground to a more slender shape, as is shown by the single dot chain line in FIG. 10.

As is mentioned above, according to the third embodiment of the present invention, the shank portion 32 is hardened beforehand by vacuum quenching. Thus, when the diameter of the inner wall 33a is enlarged by fitting the drill portion 31 into the hole 13, the fastening joint strength due to the enlargement of the inner wall 33a increases. Furthermore, the drill portion 31 has a smoother surface and is not deformed by heat, resulting in a highly accurate miniature drill. Moreover, the shank portion 32 is not damaged by cutting chips while using the miniature drill 30 for cutting.

Although the cylinder of material 40 to be formed into the shank portion 32 is vacuum quenched in the third embodiment, the shank portion 32 may be vacuum quenched after being machined. In such a case, the forming accuracy of the resulting shank portion 32 deteriorates to some extent, and surface treatment is required; also quenching under a normal atmosphere may be employed instead of vacuum quenching.

Nitriding can also be employed instead of quenching. For example, after forming the cylinder of material 40 into the shank portion 32 shown in FIG. 8, the shank portion is heated at approximately 500° C. for 18 to 19 hours in a gaseous ammonium atmosphere, and then, allowed to stand for cooling. The surface of the shank portion 32 is thereby hardened. Furthermore, deformation does not occur because heat treatment such as quenching is unnecessary.

The materials used for the drill portions 11, 21, and 31 are not limited to cemented carbide, and other suitable materials such as cermet can be employed as long as they are harder than the shank portions. The materials used for the shank portions 12, 22, and 32 are not restricted to SUS and steel, and other materials such as aluminum alloys may be used.

The hole 13 of the shank portions 12, 22, and 32 and the rear 11a, 21a, and 31a of the drill portions 11, 21, and 31, respectively, are not limited to cylindrical shapes, and may be prismatic shapes.

The present invention can be applied not only to miniature drills but also to other cutting tools such as drilling tools, small-diameter end mills, and the like.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cutting tool comprising:

a shank portion having a hole; and a drill portion fitted into said hole of said shank portion to form a joint, said drill portion having a drill edge, wherein a step is formed at said joint, wherein a surface of said shank portion is hardened.

2. A cutting tool according to claim 1, wherein an inner wall of said hole of said shank portion is hardened.

3. A cutting tool according to claim 1, wherein a rear edge of said drill portion has a rounded chamfer.

4. A cutting tool according to claim 1, wherein a rear edge of said drill portion has a linear chamfer.

5. A cutting tool according to claim 1, wherein a rear edge of said drill portion forms a sharp point.

6. A cutting tool according to claim 1, further comprising a space between a rear edge of said drill portion and a bottom of said hole of said shank portion.

* * * * *